(12) United States Patent
Ikebe et al.

(10) Patent No.: US 10,273,905 B2
(45) Date of Patent: Apr. 30, 2019

(54) EXHAUST EMISSION CONTROL DEVICE FOR INTERNAL COMBUSTION ENGINE

(71) Applicant: HONDA MOTOR CO., LTD., Tokyo (JP)

(72) Inventors: Yoshiyuki Ikebe, Wako (JP); Hiroshi Yokota, Wako (JP); Hiroyuki Sugiura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 586 days.

(21) Appl. No.: 15/007,895

(22) Filed: Jan. 27, 2016

(65) Prior Publication Data
US 2016/0222922 A1 Aug. 4, 2016

(30) Foreign Application Priority Data
Feb. 2, 2015 (JP) .................... 2015-018079

(51) Int. Cl.
*F02B 75/20* (2006.01)
*F02M 23/00* (2006.01)
*F01N 3/22* (2006.01)
*F01L 3/20* (2006.01)

(52) U.S. Cl.
CPC ........... *F02M 23/003* (2013.01); *F01L 3/205* (2013.01); *F01N 3/22* (2013.01); *F02B 75/20* (2013.01); *F01N 2590/04* (2013.01)

(58) Field of Classification Search
CPC .................................. F01N 3/30; Y02T 10/20
USPC ....................................................... 123/58.1
See application file for complete search history.

(56) References Cited

U.S. PATENT DOCUMENTS

| 4,083,184 A | * | 4/1978 | Ushijima | .................. F01N 3/30 137/515.7 |
| 4,387,565 A | * | 6/1983 | Otani | ........................ F01N 3/34 180/219 |
| 4,430,857 A | | 2/1984 | Ikenoya et al. | |

(Continued)

FOREIGN PATENT DOCUMENTS

| EP | 1627999 A2 | 2/2006 |
| EP | 1767756 A1 | 3/2007 |
| JP | H09-324624 | 12/1997 |

*Primary Examiner* — Marguerite J McMahon
*Assistant Examiner* — James J Kim
(74) *Attorney, Agent, or Firm* — Rankin, Hill & Clark LLP

(57) ABSTRACT

An exhaust emission control device for an internal combustion engine including multiple reed valve chambers which are provided to cylinder head portions of a multi-cylinder engine. The reed valve chambers are formed by covering recessed portions in the cylinder head portion with reed valve covers. Upstream sides of the reed valve chambers communicate with the atmosphere via a secondary air supply pipe. Downstream sides of the reed valve chambers communicate with exhaust ports via communication passages provided to the cylinder head portion. The reed valves are interposed between the upstream sides and the downstream sides of the reed valve chambers, and are opened by exhaust pulsation pressure. In the cylinder head portion, the multiple reed valve chambers are disposed with spaces therebetween. The reed valve covers communicate individually with the secondary air supply pipe, and the reed valve covers are connected in series by the secondary air supply pipe.

13 Claims, 11 Drawing Sheets

(56) References Cited

U.S. PATENT DOCUMENTS

| | | | | |
|---|---|---|---|---|
| 4,450,684 A | * | 5/1984 | Otani | F01N 3/22 |
| | | | | 60/290 |
| 4,454,714 A | * | 6/1984 | Ikenoya | F01N 3/34 |
| | | | | 180/219 |
| 4,476,676 A | * | 10/1984 | Ikenoya | F01N 3/22 |
| | | | | 60/290 |
| 4,727,717 A | * | 3/1988 | Ikenoya | F01L 3/205 |
| | | | | 180/219 |
| 2005/0204730 A1 | | 9/2005 | Tsukahara et al. | |
| 2006/0037311 A1 | * | 2/2006 | Nakayama | F01N 3/30 |
| | | | | 60/289 |
| 2009/0071421 A1 | * | 3/2009 | Maehara | F01L 1/053 |
| | | | | 123/41.86 |

* cited by examiner

EXHAUST EMISSION CONTROL DEVICE FOR INTERNAL COMBUSTION ENGINE

BACKGROUND OF THE INVENTION

Field of the Invention

The present invention relates to an exhaust emission control device for an internal combustion engine, which supplies secondary air to an exhaust system.

Description of Related Art

For example, Japanese Patent Application Publication No. Hei 9-324624 (FIGS. 1 to 5) shows an exhaust emission control device for an internal combustion engine, which introduces secondary air into an exhaust port by opening reed valves provided to a cylinder head portion by using exhaust pulsation pressure. This publication shows a structure where two reed valves are arranged side-by-side and covered with one reed valve cover.

However, since the multiple reed valves are arranged side-by-side, the structure shown in Japanese Patent Application Publication No. Hei 9-324624 (FIGS. 1 to 5) makes the reed valve cover for covering the reed valves become larger in size, and accordingly may make it difficult to lay out the reed valve cover in the cylinder head portion.

SUMMARY OF THE INVENTION

The present invention has been made with the foregoing conventional technique taken into consideration. An object of the present invention is to provide an exhaust emission control device whose size and weight can be reduced by making no connecting member between a secondary air supply pipe and reed valve covers, and no branch leading away from the secondary air supply pipe, necessary in an internal combustion engine in which each cylinder head portion is provided with multiple reed valve chambers.

For the purpose of solving the above-mentioned problem, a first aspect of the present invention provides an exhaust emission control device for an internal combustion engine including:

multiple reed valve chambers respectively including reed valves, and provided to a cylinder head portion of a multi-cylinder internal combustion engine, the reed valve chambers are formed by covering recessed portions provided to the cylinder head portion respectively with reed valve covers, the reed valve chambers have upstream sides, which communicate with the atmosphere via a secondary air supply pipe, and downstream sides, which communicate with exhaust ports via communication passages provided to the cylinder head portion, and the reed valves are interposed between the upstream sides and the downstream sides of the reed valve chambers, and the reed valves are opened by exhaust pulsation pressure, in which in the cylinder head portion, the multiple reed valve chambers are disposed with spaces therebetween, and the multiple reed valve chambers communicate individually with, and are formed integrally with, the secondary air supply pipe, and the reed valve covers are connected in series by the secondary air supply pipe.

According to the exhaust emission control device for an internal combustion engine of the first aspect of the present invention, the multiple reed valve chambers are disposed with spaces therebetween, and the size of each reed valve cover is reduced; and the multiple reed valve covers communicating individually with, and formed integrally with, the secondary air supply pipe are connected in series by the secondary air supply pipe. Thereby, the multiple reed valve covers can be handled as a single part, and is made capable of receiving the supply of secondary air. Thus, no connecting member is needed between the secondary air supply pipe and each reed valve cover; no branch leading away from the secondary air supply pipe need be formed; and a reduction in the size and weight of the exhaust emission control device is achieved.

According to a second aspect of the present invention, an exhaust emission control device for an internal combustion engine in which all of the plurality of reed valve covers connected in series by the secondary air supply pipe are connected to, and integrally formed with, a single one of the secondary air supply pipe. Since the multiple reed valve covers are produced as one unitary part, part precision increases, and the number of parts and the number of assembling steps decrease.

A third aspect of the present invention is the exhaust emission control device for an internal combustion engine, in which:

each of the reed valve chambers is disposed to be inclined from a horizontal direction, a communication passage inlet leading to a corresponding one of the communication passages is formed above a bottom portion of an inside of the reed valve chamber, and a bottom portion of an intra-pipe passage of the secondary air supply pipe is disposed above the communication passage inlet.

Since the communication passage inlet is disposed at the place higher than the bottom portion of the inside of the reed valve chamber, water in the secondary air can be prevented from flowing into the exhaust port via the communication passage. Since the bottom portion of the intra-pipe passage of the secondary air supply pipe is disposed at the place higher than the communication passage inlet, the cross-sectional area of the intra-pipe passage of the secondary air supply pipe can be secured by preventing water in the secondary air from staying inside the secondary air supply pipe, and the hindrance to the supply of the secondary air can be prevented.

A fourth aspect of the present invention provides the exhaust emission control device for an internal combustion engine, in which:

the reed valve covers are each shaped almost like a rectangle having a longitudinal direction, and the secondary air supply pipe is disposed in an apex portion of the cylinder head portion in a way to extend in the longitudinal direction of the reed valve covers, and in a way to overlap the reed valve covers as viewed in a direction of a cylinder axis.

Since the secondary air supply pipe is disposed to overlap the multiple reed valve covers, the space of the apex portion of the cylinder head portion is effectively used.

A fifth aspect of the present invention provides the exhaust emission control device for an internal combustion engine, in which:

the multi-cylinder internal combustion engine is an in-line multi-cylinder internal combustion engine, multiple ignition coil devices respectively for cylinder are provided to an outer end of the cylinder head portion in the direction of the cylinder axis, and the reed valve chambers and the ignition coil devices are alternately disposed.

When the row of the ignition coil devices and the row of the reed valve chambers are shifted from each other in the row width direction, the ignition coil devices and the reed valve covers alternately disposed in the apex portion of the cylinder head portion are placed closer to one another. Thereby, a reduction in the size of the cylinder head portion can be achieved.

A sixth aspect of the present invention provides the exhaust emission control device for an internal combustion engine, in which:

the in-line multi-cylinder internal combustion engine is a horizontally-opposed multi-cylinder internal combustion engine including two of the cylinder head portions, and the two cylinder head portions include the reed valve covers and the secondary air supply pipe common to each other.

The use of the mutually-common reed valve covers and the mutually-common secondary air supply pipes in the two cylinder head portions makes it possible to reduce the number of types of parts.

BRIEF DESCRIPTION OF THE DRAWINGS

These and further features of the invention will be apparent with reference to the following description and drawings, wherein.

DETAILED DESCRIPTION OF THE INVENTION

Figure 1:
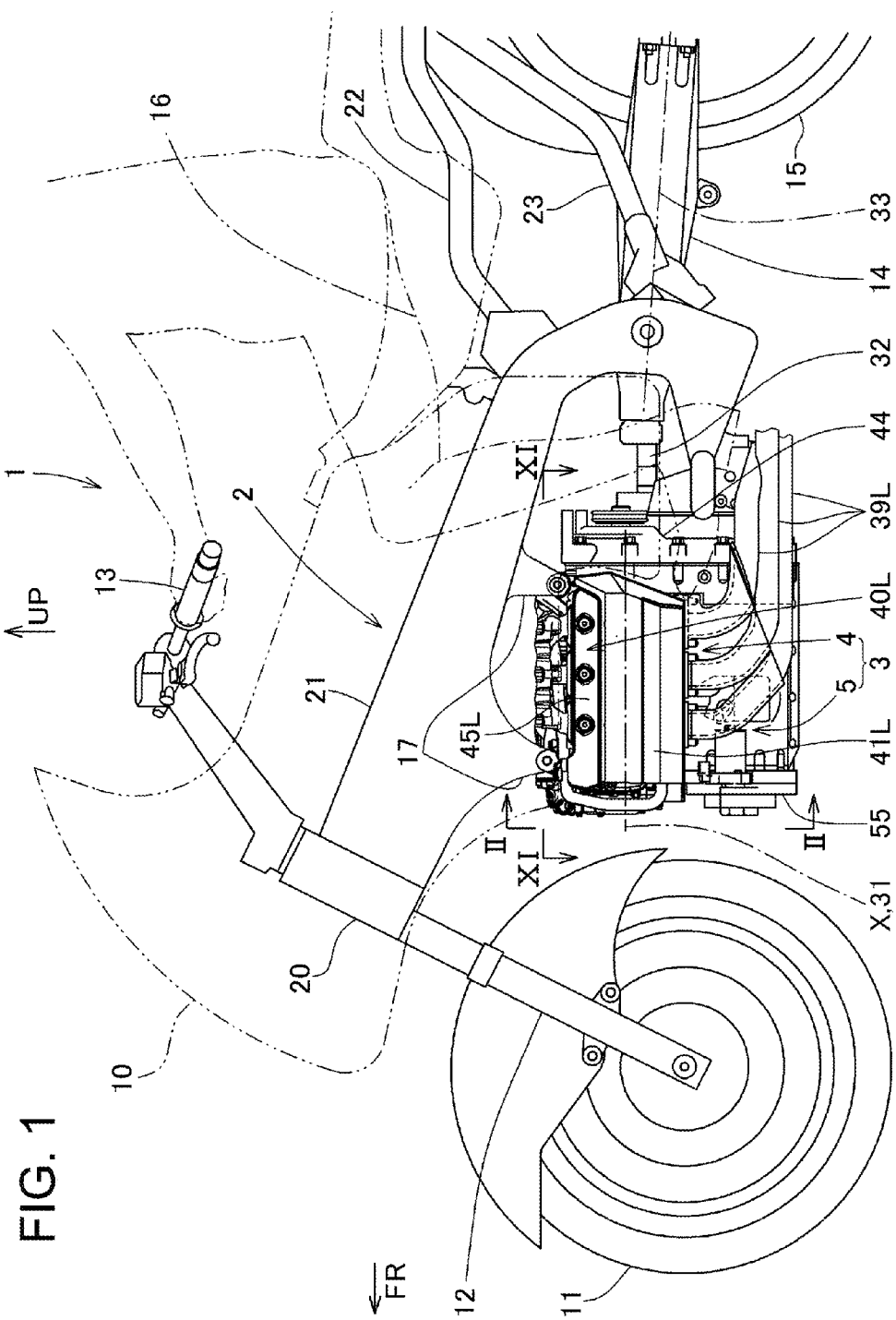
FIG. 1 is a left-side view of a main part of a motorcycle on which a power unit provided with an exhaust emission control device for an internal combustion engine of an embodiment of the present invention is mounted.

Based on FIGS. 1 to 11, descriptions will be provided for an exhaust emission control device for an internal combustion engine of an embodiment of the present invention.

Directions, such as forward, rearward, leftward, rightward, upward and downward, in the scope of claims and explanations in the description are directions viewed from a vehicle in which a power unit provided with an exhaust emission control device for an internal combustion engine of the embodiment is installed. In the embodiment, the vehicle is a saddle-ride type vehicle, and specifically a motorcycle.

In the drawings, arrows FR, LH, RH and UP mean toward the front of the vehicle, the left of the vehicle, the right of the vehicle and the upper side of the vehicle, respectively.

FIG. 1 is a left-side view of a main part of a motorcycle 1 in which a power unit 3 provided with an exhaust emission control device for an internal combustion engine of an embodiment of the present invention is installed.

In an internal combustion engine 4 such as the power unit 3 installed in a vehicle such as the motorcycle 1, the exhaust emission control device of the present invention supplies secondary air to an exhaust system of the internal combustion engine 4, and thereby facilities combustion of unburned hazardous components included in an exhaust gas flowing in the exhaust system.

FIG. 1 shows only a main part of the motorcycle 1 with a vehicle body 10 outlined with a chain double-dashed line while omitting part of the vehicle body 10, as well as with the illustrations of an intake system, the exhaust system, a fuel system and the like omitted or simplified.

A vehicle body frame 2 of the motorcycle 1 includes: a head pipe 20 steerably supporting a front fork 12 pivotally supporting a front wheel 11; a main frame 21 extending rearward and downward from the head pipe 20; a seat rail 22 extending rearward and upward from an upper portion of a rear end of the main frame 21; and a back stay 23 connecting a lower portion of the rear end of the main frame 21 and a rear portion of the seat rail 22.

A steering handlebar 13 is connected to an upper portion of the front fork 12. In addition, a front end portion of a swing arm 14 is vertically swingably supported by a rear end portion of the main frame 21. As a driving wheel, a rear wheel 15 is pivotally supported by a rear end portion of the swing arm 14.

Furthermore, a rear cushion unit (not shown) is provided between the upper portion of the rear end of the main frame 21 and the swing arm 14. A riding seat 16 is mounted on the seat rail 22.

The power unit 3 configured to drive the rear wheel 15 is disposed in a space under the main frame 21. The power unit 3 is supported by the main frame 21 with the assistance of multiple hanger members 17.

An output shaft 32 of the power unit 3 is connected to the rear wheel 15 via a drive shaft 33 installed along the swing arm 14, and thereby transmits rotational force to the rear wheel 15.

Figure 2:
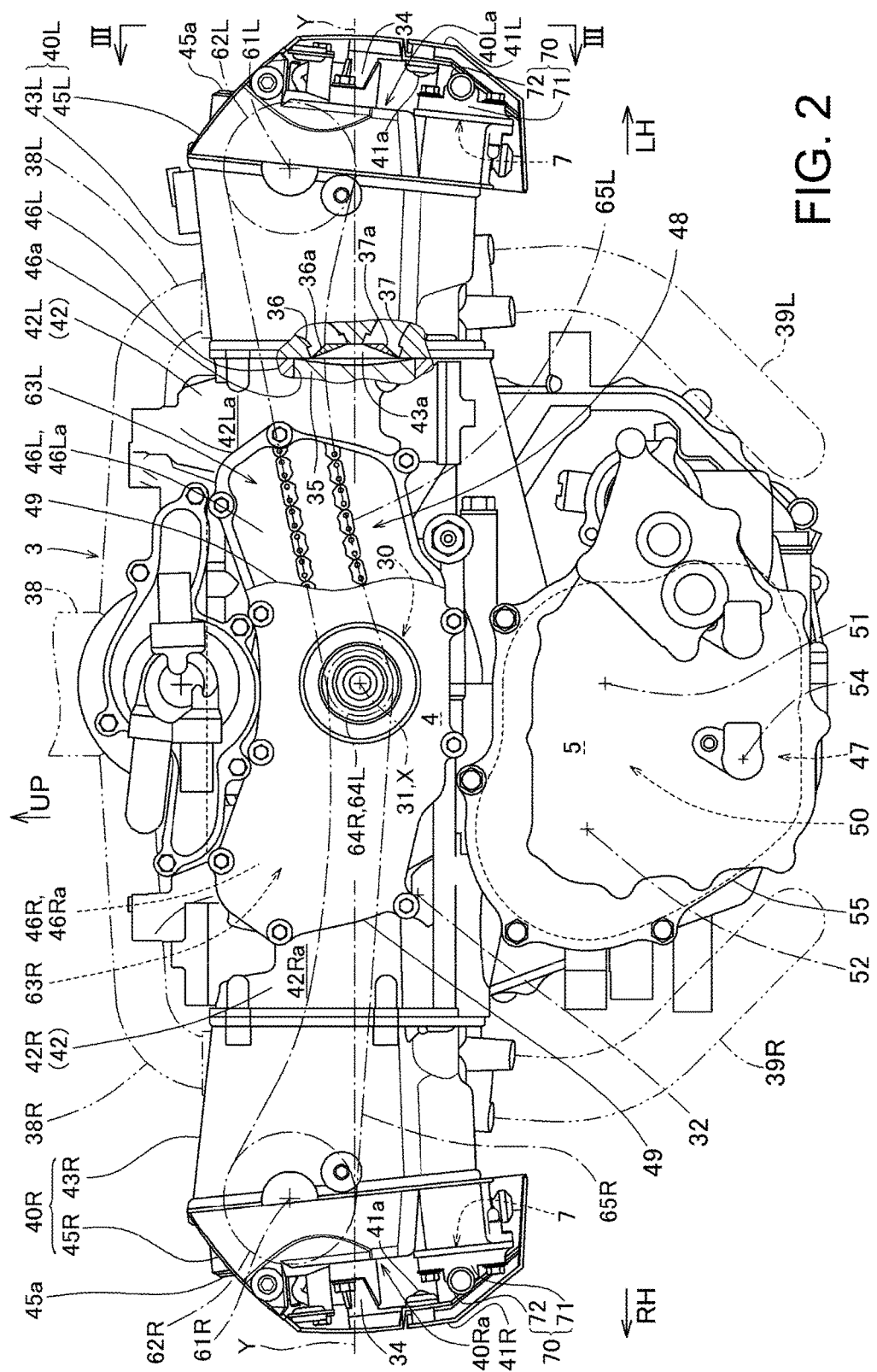
FIG. 2 is a front view of the power unit taken along the II-II arrow in FIG. 1.

FIG. 2 is a front view of the power unit 3 taken along the II-II arrow in FIG. 1.

As shown in FIGS. 1 and 2, the power unit 3 is an inline multi-cylinder internal combustion engine with a crankshaft 31 oriented in a vehicle front-rear direction. The power unit 3 is formed from: a water-cooled 4 stroke-cycle horizontally-opposed 6-cylinder internal combustion engine 4 with 3 cylinders arranged in a straight line in each of the left and right parts of the engine (hereinafter referred to as an "internal combustion engine," and corresponding to a "multi-cylinder internal combustion engine" of the present invention); and a transmission 5 configured to change the speed of the rotational force from the internal combustion engine 4, and including a reverse transmission system for reversing a rotational direction of the rotational force.

A case body of the power unit 3 includes: a crankcase 42 formed from a left crankcase 42L and a right crankcase 42R; left and right cylinder heads 43L, 43R joined to both an outer end of the left crankcase 42L and an outer end of the right crankcase 42R, respectively; and a rear cover 44 joined to the left and right crankcases 42L, 42R (see FIG. 1). The left crankcase 42L is disposed on the left of the power unit 3 as directed forward in a running direction of the motorcycle 1. The right crankcase 42R is disposed on the right of the power unit 3 as directed forward in the running direction of the motorcycle 1.

The rear cover 44 is joined to cover rear portions of the left and right crankcases 42L, 42R in the running direction of the motorcycle 1. The output shaft 32 of the power unit 3 projects rearward from the rear cover 44, and is connected to the drive shaft 33 (see FIG. 1).

Incidentally, left and right cylinder head covers 45L, 45R are fastened to both an outer end of the left cylinder head 43L and an outer end of the right cylinder head 43R, respectively. Thereby, the left and right cylinder head covers 45L, 45R cover left and right valve mechanisms, as well as driven sprockets 62L, 62R of camshafts 61L, 61R of the left and right valve mechanisms, which are all provided inside the left and right cylinder heads 43L, 43R.

The left cylinder head 43L and the left cylinder head cover 45L form a left cylinder head portion 40L. The right cylinder head 43R and the right cylinder head cover 45R form a right cylinder head portion 40R. Three ignition coil devices 34 and three reed valve chambers 7, albeit described later, for the three left cylinders are disposed in an apex portion 40La of the left cylinder head portion 40L (see FIG. 4). Similarly, three ignition coil devices 34 and three reed valve chambers 7, albeit described later, for the three right cylinders are disposed in an apex portion 40Ra of the right cylinder head portion 40R.

Left and right head side covers 41L, 41R are attached to the left and right apex portions 40La, 40Ra, respectively. Each of the left and right head side covers 41L, 41R covers its corresponding three ignition coil devices 34 and three reed valve chambers 7. The left and right head side covers 41L, 41R each serve as a design cover or decorative cover, and enhance the external appearance and the protection of the apparatuses covered by the left and right head side covers 41L, 41R.

The left and right crankcases 42L, 42R form the crankcase 42 by being fastened together. The mating surfaces of the left and right crankcases 42L, 42R rotationally support the crankshaft 31 which is almost horizontally disposed with an axis X of the crankshaft 31 coinciding with the front-rear direction of the motorcycle 1, and define a crank chamber 30 around the crankshaft 31.

In addition, the left and right crankcases 42L, 42R contain left and right cylinder block portions 46L, 46R in the left and right halves of the crank chamber 30, respectively. Three cylinder bores 46a (see FIG. 2) through which to insert pistons 35, respectively, are formed in each of the left and right cylinder block portions 46L, 46R with cylinder axes Y of the respective cylinder bores 46a oriented horizontally and in parallel to one another. The pistons 35 are commonly connected to the crankshaft 31 with the assistance of connecting rods (not illustrated).

In the left and right crankcases 42L, 42R, a transmission chamber 50 is defined under the crank chamber 30, where a main shaft 51 and a counter shaft 52 of the transmission 5, oriented in parallel to the crankshaft 31 and in the vehicle front-rear direction, are supported. In the left and right crankcases 42L, 42R, an oil pan portion 47 is formed under the transmission chamber 50.

As shown in FIG. 2, a cam chain chamber opening 48 is provided to left and right crankcase front walls 42La, 42Ra, which are front portions of the left and right crankcases 42L, 42R fastened together. In the left and right crankcase front walls 42La, 42Ra, the cam chain chamber opening 48 opens from areas around the crankshaft 31 to areas near the left and right cylinder heads 43L, 43R, respectively.

A cam chain chamber cover 49 is fastened to a peripheral edge of the cam chain chamber opening 48. The cam chain chamber cover 49 covers the cam chain chamber opening 48, and the front of the crank chamber 30.

In addition, a transmission holder 55 is provided around the main shaft 51 and the counter shaft 52 of the transmission 5 disposed under the crank shaft 31, as well as a shift drum 54 (the positions of center axes of which are shown in FIG. 2) and the like in a way that the transmission holder 55 is joined to the left and right crankcases 42L, 42R, and covers a front portion of the transmission chamber 50.

The transmission chamber 50 is formed from the transmission holder 55 to the insides of the left and right crankcases 42L, 42R. The transmission 5 is housed in the transmission chamber 50.

In the left and right crankcases 42L, 42R, left and right cam chain chambers 63L, 63R communicating with insides of the left and right cylinder heads 43L, 43R are defined along side portions of the cylinder block portions 46L, 46R which are on the front side (on this side in the illustration of FIG. 2) in a direction of the crankshaft 31. Together with the left and right crankcase front walls 42La, 42Ra, the cam chain chamber cover 49 constitutes part of a front wall covering the left and right cam chain chambers 63L, 63R.

It should be noted that FIG. 2 shows the cam chain chamber cover 49 with its left-side portion (a right-side portion in the illustration) partially cut away. In FIG. 2, a front side portion 46La of the left cylinder block portion 46L is seen behind the illustrated cut-away portion, while the left cam chain chamber 63L is seen in front of the illustrated front side portion 46La. Part of a left cam chain 65L stretched inside the cam chain chamber 63L is illustrated in FIG. 2.

In the right-side portion of the cam chain chamber cover 49 (a left-side portion in the illustration), similarly, a front side portion 46Ra of the right cylinder block portion 46R, the right cam chain chamber 63R and a right cam chain 65R are disposed.

Across the left cam chain chamber 63L, the cam chain 65L configured to transmit force of the crankshaft 31 to the left camshaft 61L is wound between a driving sprocket 64L, fitted to a front end side of the crankshaft 31, for the left camshaft 61L and the driven sprocket 62L of the camshaft 61L in the left valve mechanism provided to the left cylinder head 43L.

In addition, across the right cam chain chamber 63R, the cam chain 65R configured to transmit the force of the crankshaft 31 to the right camshaft 61R is wound between a driving sprocket 64R, fitted to the front end side of the crankshaft 31, for the right camshaft 61R and the driven sprocket 62R of the camshaft 61R in the right valve mechanism provided to the right cylinder head 43R.

By these, the left and right valve mechanisms are driven. In synchronism with rotation of the crankshaft 31, intake valves 36a of intake ports 36 and exhaust valves 37a of exhaust ports 37, corresponding to the respective cylinder bores 46a, are opened and closed at predetermined timing. Thereby, air is sucked into, and exhausted from, combustion chambers 38 formed between the left cylinder head 43L and the corresponding pistons 35, as well as between the right cylinder head 43R and the corresponding pistons 35.

Three left intake pipes 38L coupled to the three corresponding intake ports 36 are connected to an upper portion of the left cylinder head 43L, and three right intake pipes 38R coupled to the three corresponding intake ports 36 are connected to an upper portion of the right cylinder head 43R. The left and right intake pipes 38L, 38R bend inward in a vehicle width direction above the power unit 3, and are connected to a manifold 38 on the power unit 3.

Three left exhaust pipes 39L coupled to the three corresponding exhaust ports 37 are connected to a lower portion of the left cylinder head 43L (see FIG. 1), and three right exhaust pipes 39R coupled to the three corresponding exhaust ports 37 are connected to a lower portion of the right cylinder head 43R. The left and right exhaust pipes 39L, 39R extend downward from the lower portions of the left and right cylinder heads 43L, 43R, subsequently bend rearward obliquely downward and toward the center in the vehicle width direction, thereafter extend rearward along an outer wall surface of the crankcase 42 in a lower portion of the power unit 3, and are connected to an exhaust muffler (not shown) disposed in a rear portion of the vehicle.

Figure 3:
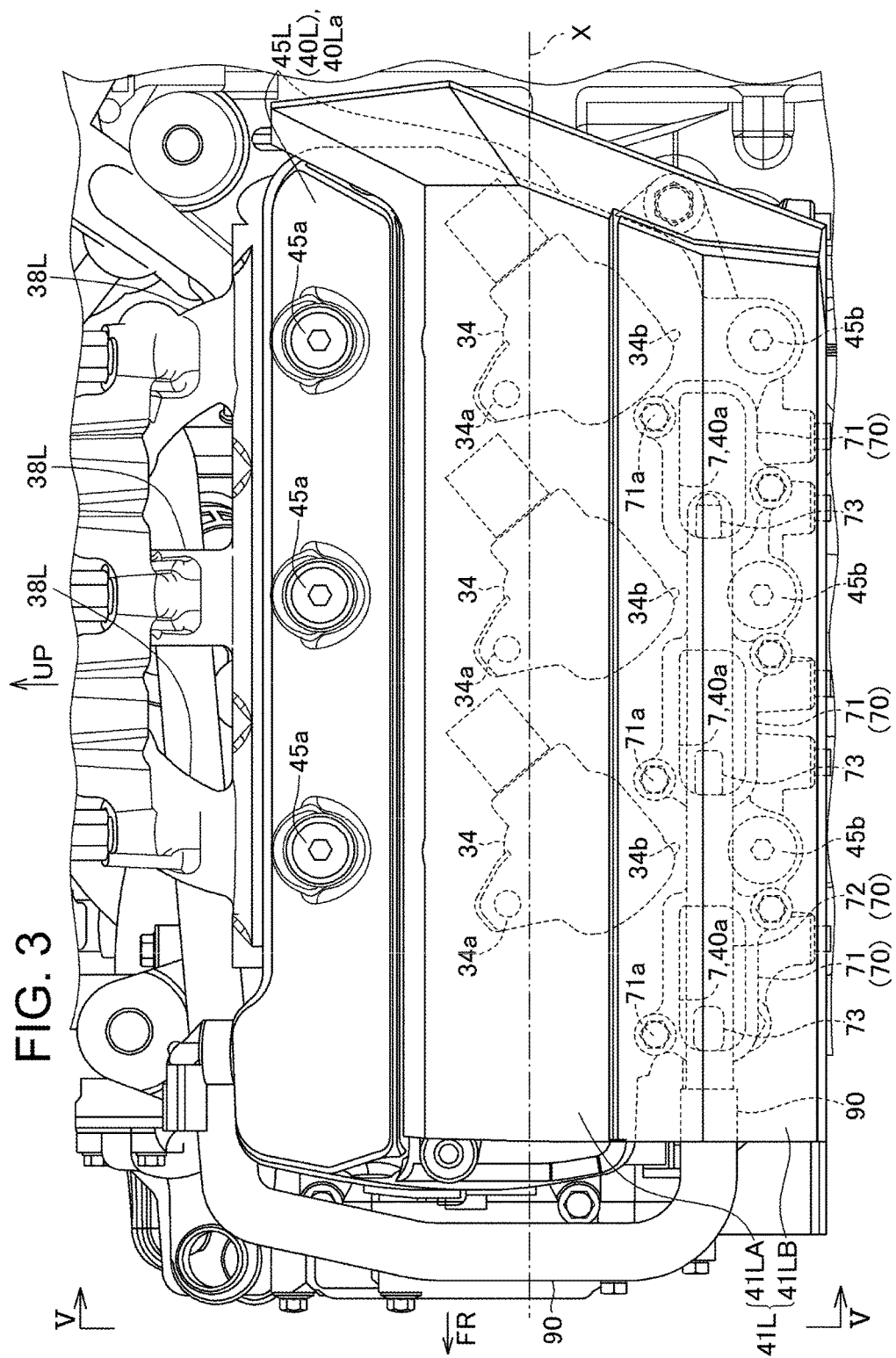
FIG. 3 is a left-side view of an apex portion of a left cylinder head portion and its vicinity in the power unit taken along the III-III arrow of FIG. 2.

FIG. 3 is a left-side view of the apex portion 40La of the left cylinder head portion 40L and its vicinity in the power unit 3 taken along the III-III arrow of FIG. 2, with the left exhaust pipes 39L excluded.

A right-side view of the apex portion 40Ra of the right cylinder head portion 40R and its vicinity in the power unit 3 is the same as that left-side view. For this reason, as an example, the left cylinder head portion 40L will be described unless particularly indicated, and the illustration and descriptions for the right cylinder head portion 40R will be omitted.

FIG. 3 shows: the left cylinder head cover 45L fastened to the left cylinder head 43L (see FIG. 2) with upper and lower head cover bolts 45a, 45b; and the left head side cover 41L attached to the left cylinder head cover 45L, and covering an area from a middle portion to a lower portion of the left cylinder head cover 45L in a vertical direction.

The left cylinder head 43L and the left cylinder head cover 45L constitute the left cylinder head portion 40L. The apex portion 40La of the left cylinder head portion 40L, or an apex portion of the left cylinder head cover 45L, includes the three ignition coil devices 34 which respectively correspond to the three cylinder bores 46a (see FIG. 2) arranged in a direction of the axis X of the crankshaft 31, and which are attached to an outer end of the left cylinder head portion 40L in a direction of the cylinder axis Y (see FIG. 2). The three ignition coil devices 34 are arranged in the direction of the axis X of the crankshaft 31, and are fastened to the outer end of the left cylinder head portion 40L with coil attachment bolts 34a.

In addition, three reed valve chambers 7 are arranged in the direction of the axis X of the crankshaft 31 with spaces therebetween. The reed valve chambers 7 and the ignition coil devices 34 are alternately disposed. The reed valve chambers 7 are individually covered with reed valve covers 71, respectively. The reed valve covers 71 are fastened to the apex portion 40La with cover attachment bolts 71a, respectively.

The three ignition coil devices 34 and the reed valve covers 71 of the three respective reed valve chambers 7 are covered with and protected by the head side cover 41L.

The internal combustion engine 4 of the embodiment is the inline multi-cylinder internal combustion engine. The ignition coil devices 34 and the reed valve chambers 7 are alternately disposed in the direction of the axis X of the crankshaft 31. Since the row of the ignition coil devices 34 and the row of the reed valve chambers 7 are shifted from each other in a row width direction, the ignition coil devices 34 and the reed valve covers 71 of the reed valve chambers 7 alternately disposed in the apex portion 40La of the cylinder head portion 40L are placed closer to one another. Thereby, a reduction in the size of the cylinder head portion 40L is achieved.

Figure 4:
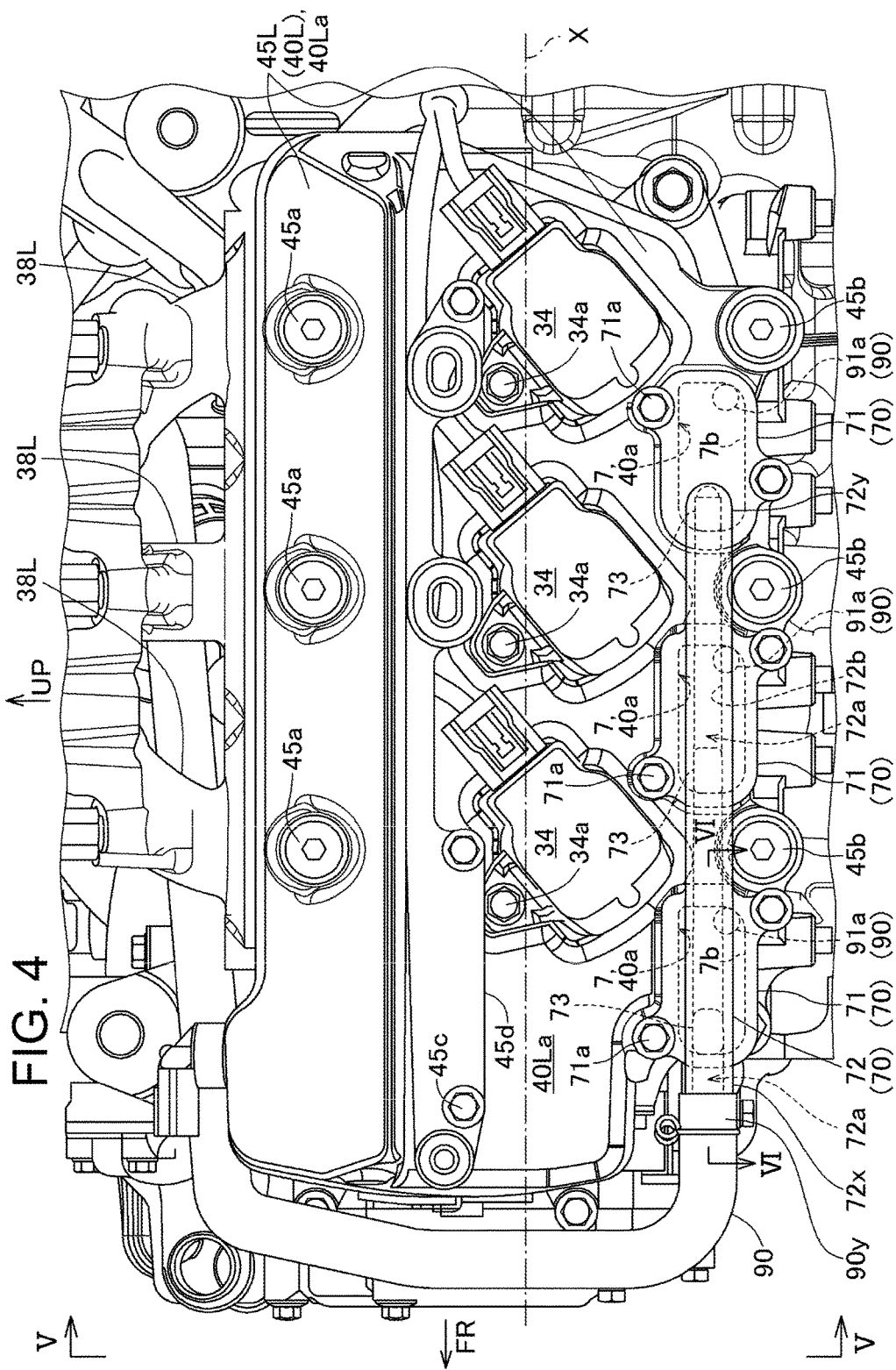
FIG. 4 is a left-side view of the apex portion of the left cylinder head portion and its vicinity in the power unit with a head side cover in FIG. 3 detached from the left cylinder head portion.

FIG. 4 shows a left-side view of the apex portion 40La of the left cylinder head portion 40L and its vicinity in the power unit 3 with the head side cover 41L in FIG. 3 detached from the left cylinder head portion 40L.

In the apex portion 40La of the cylinder head portion 40L, the three reed valve chambers 7 arranged side-by-side with spaces therebetween are formed by individually covering three recessed portions 40a, which are provided to the apex portion 40La of the cylinder head portion 40L, or the apex portion of the left cylinder head 43L, with the reed valve covers 71. The three reed valve chambers 7 include reed valves 7a (see FIG. 6), respectively.

The three reed valve covers 71 communicate via distribution holes 73 individually with and are formed integrally with a secondary air supply pipe 72, and the reed valve covers 71 are connected in series by the secondary air supply pipe 72.

For this reason, when corner portions 34b (see FIG. 3) of the ignition coil devices 34 are disposed in a way that the corner portions 34b enter the gaps at narrow-width locations of the secondary air supply pipe 72 connecting the mutually-adjacent reed valve covers 71, the ignition coil devices 34 and the reed valve covers 71 of the reed valve chambers 7 alternately disposed are arranged much closer to one another. Accordingly, a further reduction in the size of the cylinder head portion 40L is achieved.

Furthermore, the lower head cover bolts 45b fastening the left cylinder head cover 45L to the left cylinder head 43L (see FIG. 2) are disposed in a way that the lower head cover bolts 45b enter the gaps at the narrow-width locations of the secondary air supply pipe 72 connecting the mutually-adjacent reed valve covers 71, on the opposite side of the narrow-width location from the ignition coil devices 34. This secures easy access to the bolts for a tool, and shortens the distance between the lower head cover bolts 45b and the upper head cover bolts 45a. Accordingly, a much further reduction in the size of the cylinder head portion 40L is achieved.

A downstream end 72y of the secondary air supply pipe 72 formed integrally with the reed valve cover 71 on rear end side (on the right end side in the illustration) is closed, while an upstream end 72x of the secondary air supply pipe 72 formed integrally with the reed valve cover 71 on front end side (on the left end side in the illustration) is connected to a downstream end 90y of a secondary air pipe 90 communicating with a clean side of the intake system (not illustrated). Secondary air is supplied from the secondary air pipe 90 into all the reed valve covers 71.

Corresponding to the cylinder bores 46a, respectively, the reed valve chambers 7 including the reed valves 7a and covered with the reed valve covers 71 are disposed with spaces therebetween. For this reason, the reed valve covers 71 for forming the reed valve chambers 7 are reduced in size.

In addition, since the reed valve covers 71 communicate individually with and are formed integrally with the secondary air supply pipe 72, and since the reed valve covers 71 are connected in series by the secondary air supply pipe 72, the insides of all the reed valve covers 71 are capable of receiving the supply of the secondary air, as well as the reed valve covers 71 and the secondary air supply pipe 72 can be handled as a single part. Thus, no connecting member is needed between the secondary air supply pipe 72 and each reed valve cover 71, as well as no branch leading away from the secondary air supply pipe 72 need be formed. Accordingly, a reduction in the size and weight of the exhaust emission control device is achieved, and ease in assembling the exhaust emission control device is achieved.

Particularly, in the embodiment, all of the three reed valve covers 71 connected in series by the secondary air supply pipe 72 are connected to and integrally formed with the single secondary air supply pipe 72 into a single integrated passage-cover unit 70 with all the reed valve covers 71 connected to the unitary secondary air supply pipe 72. An intra-pipe passage 72a of the secondary air supply pipe 72 communicates with insides 71b (see FIGS. 8 and 9) of the reed valve covers 71 via the distribution holes 73, respectively.

Figure 7:
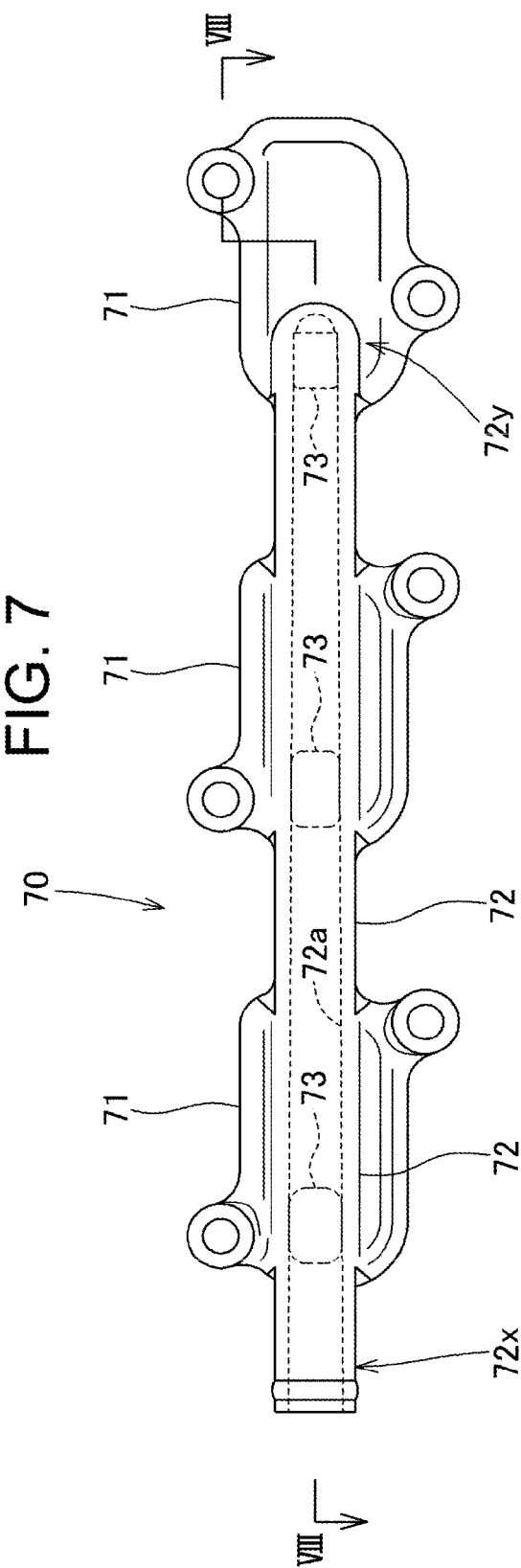
FIG. 7 is an outside view of an integrated passage-cover unit shown in FIG. 4.
Figure 8:
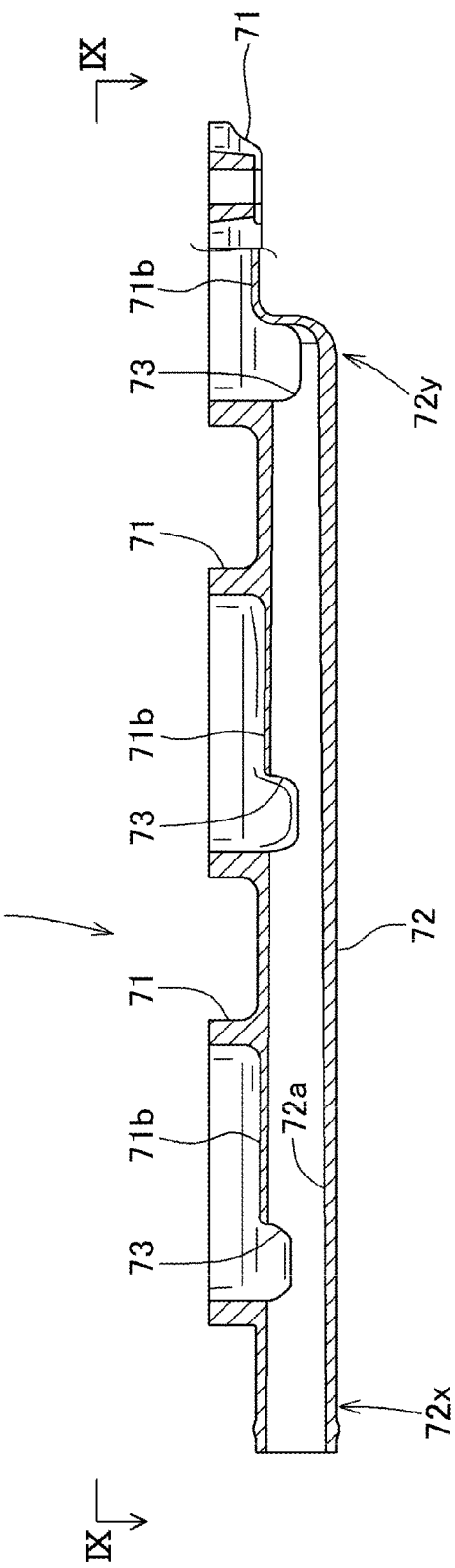
FIG. 8 is a longitudinal cross-sectional view of the integrated passage-cover unit taken along the VIII-VIII arrow of FIG. 7.
Figure 9:
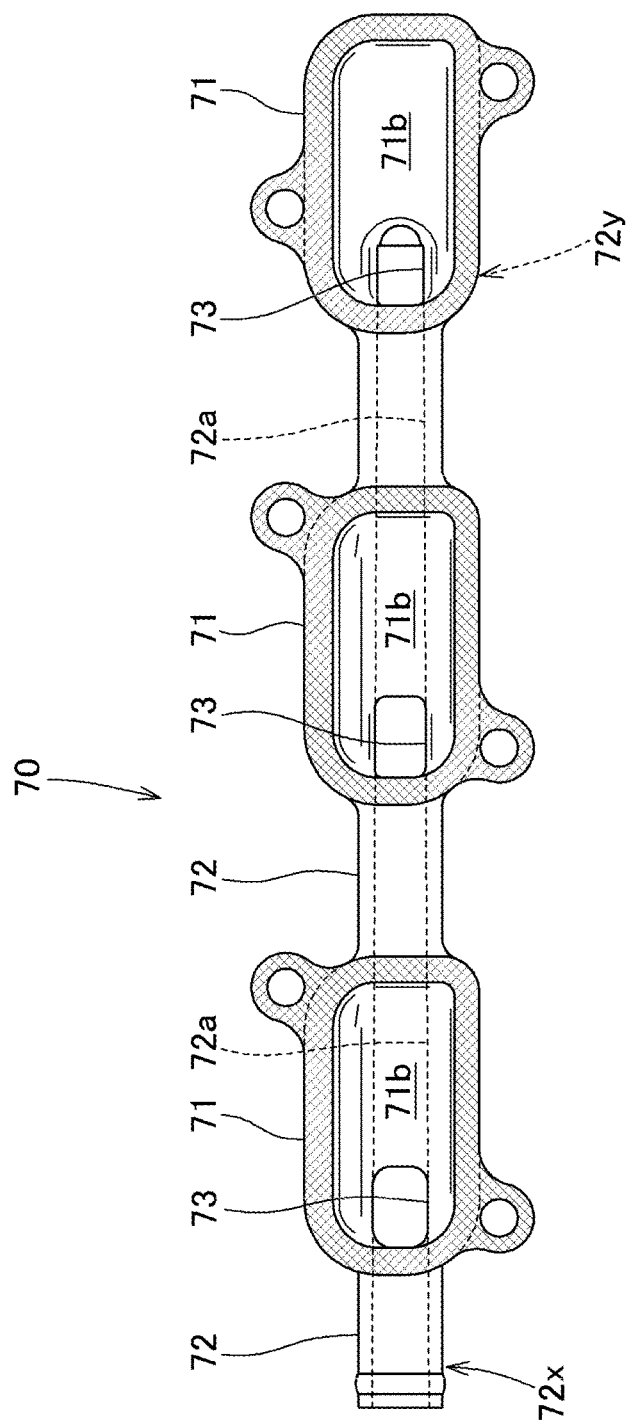
FIG. 9 is an inside view of the integrated passage-cover unit taken along the IX-IX arrow of FIG. 8.

FIG. 7 shows the outside of the integrated passage-cover unit 70 shown in FIG. 4. FIG. 8 shows a longitudinal cross-sectional view of the integrated passage-cover unit 70 along the VIII-VIII arrow of FIG. 7. FIG. 9 shows the inside of the integrated passage-cover unit 70 taken along the IX-IX arrow of FIG. 8.

In short, the integrated passage-cover unit 70 can be produced as one unitary part; part precision increases; and the number of parts and the number of assembling steps decrease.

Moreover, the intra-pipe passage 72a of the secondary air supply pipe 72 is formed in a way that an inner diameter of the intra-pipe passage 72a becomes gradually smaller toward the downstream end 72y (a right end side in the illustration) from the upstream end 72x (a left end side in the illustration) which is connected to the downstream end 90y (see FIG. 4) of the secondary air pipe 90. This makes it easy to form the integrated passage-cover unit 70.

Moreover, as also shown in FIGS. 7 to 9, the reed valve covers 71 are each shaped almost like a rectangle having a longitudinal direction. The secondary air supply pipe 72 is disposed in the apex portion 40La of the cylinder head portion 40L in a way to, as shown in FIG. 4, extend in the longitudinal directions of the reed valve covers 71, and in a way to, in a view in the direction of the cylinder axis Y, overlap the reed valve covers 71 (see FIGS. 2 and 5).

Since, in this manner, the secondary air supply pipe 72 is disposed to overlap the multiple reed valve covers 71, the space of the apex portion 40La of the cylinder head portion 40L is effectively used.

Figure 10:
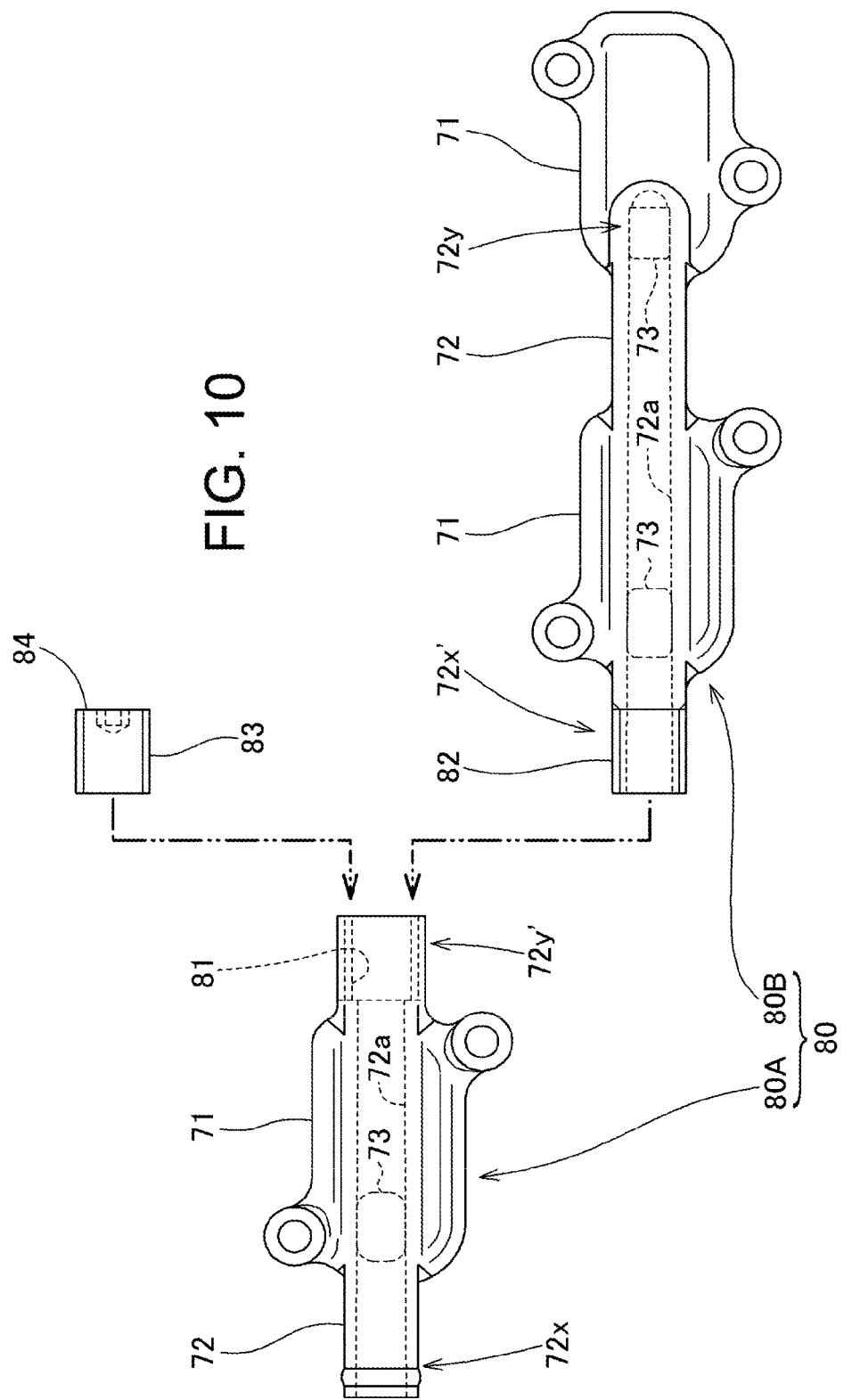
FIG. 10 is an explanatory view of a modification of the integrated passage-cover unit of the embodiment; and, FIG. 11 is an explanatory view of arrangement of the integrated passage-cover units relative to the left and right cylinder head portions in a horizontally-opposed 6-cylinder internal combustion engine of the embodiment, and corresponds to the view taken along the XI-XI arrow of FIG. 1

It should be noted that the integrated passage-cover unit 70 of the embodiment may be formed as a modification shown in FIG. 10.

An integrated passage-cover unit 80 of the modification includes: an upstream integrated passage-cover unit 80A into which one reed valve cover 71 on the front end side (the left end side in the illustration) and a secondary air supply pipe 72 are integrally formed; and a downstream integrated passage-cover unit 80B into which the other reed valve covers 71 located closer to the rear end side (the right end side in the illustration) and a secondary air supply pipe 72 are integrally formed.

An upstream end 72x (the left end side in the illustration) of the secondary air supply pipe 72 in the upstream integrated passage-cover unit 80A is connected to the downstream end 90y (see FIG. 4) of the secondary air pipe 90. A downstream side 72y' of the secondary air supply pipe 72 is provided with a female threaded portion 81, which is screwed and connected to a male threaded portion 82 of an upstream side 72x' of the secondary air supply pipe 72 of the downstream integrated passage-cover unit 80B.

The downstream end 72y of the secondary air supply pipe 72 of the downstream integrated passage-cover unit 80B is closed.

Although the illustrated case is that the screwing is the means for connecting the upstream integrated passage-cover unit 80A and the downstream integrated passage-cover unit 80B, any other appropriate means may be used.

The integrated passage-cover unit 80 of the modification of the type described above enables the upstream integrated passage-cover unit 80A to be singly used for secondary air supply in a single-cylinder internal combustion engine when the downstream side 72y' of the secondary air supply pipe 72 of the upstream integrated passage-cover unit 80A is closed with a stopper plug 84, which has a male threaded portion 83, screwed into the female threaded portion 81 of the downstream side 72y'.

Furthermore, the integrated passage-cover unit 80 can meet secondary air supply needs for various internal combustion engines because of its flexible configuration depending on the number of cylinders in each internal combustion engine, which is achieved by: corresponding to the number (one to multiple) of cylinders, producing and preparing the downstream integrated passage-cover unit 80B with as many reed valve covers 71 as the cylinders; and connecting the upstream side 72x' of the secondary air supply pipe 72 of the thus-prepared downstream integrated passage-cover unit 80B to the downstream side 72y' of the secondary air supply pipe 72 of the upstream integrated passage-cover unit 80A.

Figure 5:
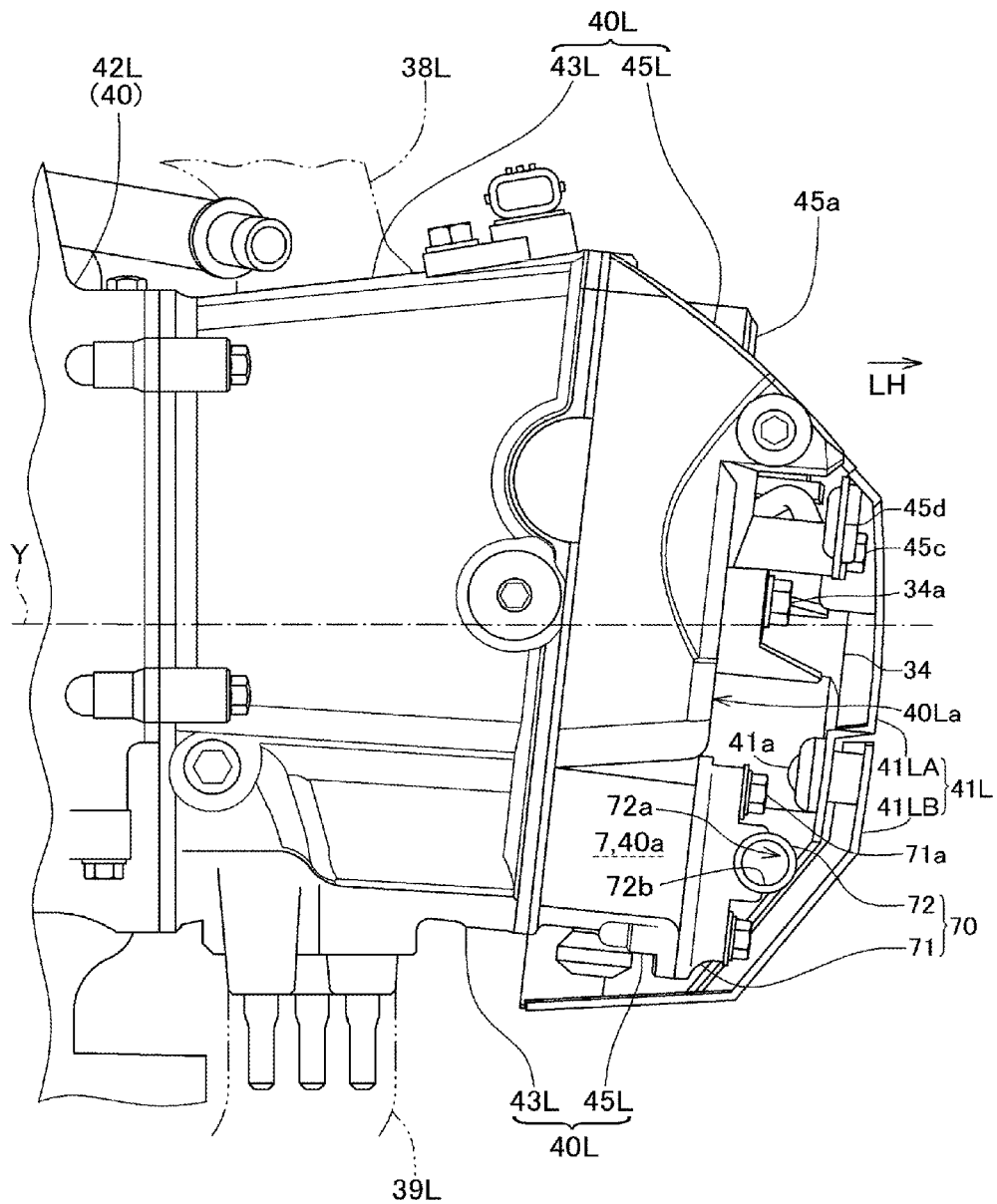
FIG. 5 is a front view of the left cylinder head portion taken along the V-V arrow of FIGS. 3 and 4.

FIG. 5 is a front view of the left cylinder head portion 40L taken along the V-V arrow of FIGS. 3 and 4, and shows the state where: in the outer end of the cylinder head portion 40L in the direction of the cylinder axis Y, the ignition coil devices 34 are attached to a central portion of the apex portion 40La of the cylinder head portion 40L in the vertical direction; and under the ignition coil devices 34, the reed valve covers 71 of the reed valve chambers 7 are attached to the apex portion 40La in the way that the reed valve covers 71 slightly overlap the ignition coil devices 34 while the reed valve chambers 7 and the ignition coil devices 34 are alternately disposed in the direction of the axis X of the crankshaft 31 (see FIG. 4).

The ignition coil devices 34 and the reed valve covers 71 are covered with the left head side cover 41L, which is attached to the left cylinder head cover 45L from the left (the right in the illustration). The head side cover 41L is formed from an upper half body 41LA and a lower half body 41LB. From inside, the lower half body 41LB is fastened to a lower portion of the upper half body 41LA with fastener bolts 41a.

As shown in FIG. 4, a stopper plate 45d is fastened to the left cylinder head cover 45L with stopper plate bolts 45c, and the upper half body 41LA is attached to the stopper plate 45d with appropriate means such as grommet fastening.

The right cylinder head portion 40R has the same structure as described above.

Figure 6:
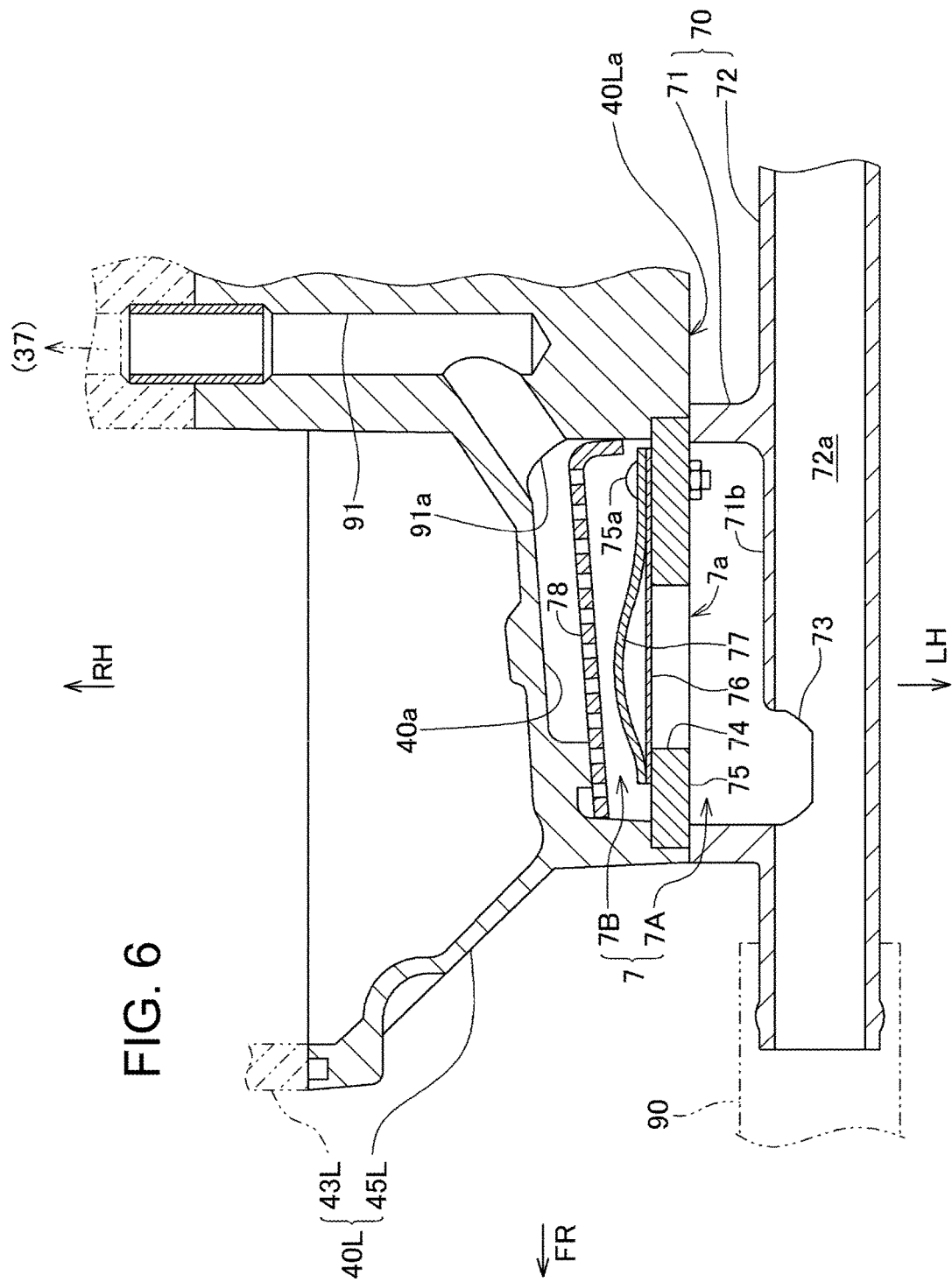
FIG. 6 is a schematic cross-sectional explanatory view of a reed valve chamber and its vicinity, and corresponds to the view taken along the VI-VI arrow of FIG. 4.

FIG. 6 is a schematic cross-sectional explanatory view of the reed valve chamber 7 and its vicinity, and corresponds to the view taken along the VI-VI arrow of FIG. 4.

The reed valve chamber 7 is formed by covering the recessed portion 40a, which is provided to the apex portion 40La of the cylinder head portion 40L, that is to say, the apex portion of the left cylinder head cover 45L in the embodiment, with the reed valve cover 71. The reed valve chamber 7 contains the reed valve 7a.

A valve seat plate 75, including a valve port 74, for the reed valve 7a is pressed to an opening end of the recessed portion 40a, and held, by the reed valve cover 71. The valve seat plate 75 divides the inside of the reed valve chamber 7 into: an upstream chamber (an "upstream side" in the present invention) 7A formed on the side of the inside 71b of the reed valve cover 71; and a downstream chamber (a "downstream side" in the present invention) 7B formed inside the recessed portion 40a. A valve body 76 covering the valve port 74, and a valve spring 77 elastically holding the valve body 76 are jointly fastened to a surface of the valve seat plate 75 on the side of the downstream chamber 7B with an attachment bolt 75a, and constitute the reed valve 7a.

Accordingly, the reed valve 7a is interposed between the upstream chamber 7A and the downstream chamber 7B of the reed valve chamber 7; and the upstream chamber 7A, i.e., the inside of the reed valve cover 71, and the inside of the secondary air supply pipe 72 communicate with each other via the distribution hole 73. For these reasons, the upstream chamber 7A receives the supply of the secondary air from the intake system, and communicates with the atmosphere, via the secondary air supply pipe 72.

Meanwhile, the downstream chamber 7B is provided with a communication passage inlet 91a, and communicates with a communication passage 91 provided extending from the left cylinder head cover 45L to the left cylinder head 43L of the cylinder head portion 40L. The downstream chamber 7B communicates with the exhaust port 37 via the communication passage 91.

Thereby, the reed valve 7a is opened by exhaust pulsation pressure in the exhaust port 37, and the secondary air in the upstream chamber 7A is supplied to the exhaust port 37 via the reed valve 7a in response to suction pressure in the exhaust port 37.

Incidentally, reference sign 78 in FIG. 6 denotes a metal plate-made punched plate (porous plate) partitioning the inside of the downstream chamber 7B. The punched plate 78 alleviates overheating of the reed valve 7a exposed to a high-temperature exhaust gas which flows back into the inside of the downstream chamber 7B of the reed valve chamber 7 from the exhaust port 37.

In the embodiment, each reed valve chamber 7 is disposed to be inclined from the horizontal direction as the result of being provided to the apex portion 40La of the cylinder head portion 40L; as shown in FIG. 4, the communication passage inlet 91a leading to the communication passage 91 is formed above a bottom portion 7b of the inside of the reed valve chamber 7; and a bottom portion 72b of the intra-pipe passage 72a of the secondary air supply pipe 72 is disposed above the communication passage inlet 91a.

Since, as described above, the communication passage inlet 91a is disposed at the place higher than the bottom portion 7b of the inside of the reed valve chamber 7, water in the secondary air is prevented from flowing into the exhaust port 37 via the communication passage 91. In addition, since the bottom portion 72b of the intra-pipe passage 72a of the secondary air supply pipe 72 is disposed at the place higher than the communication passage inlet 91a, water in the secondary air no longer stays inside the secondary air supply pipe 72. Thus, the cross-sectional area of the intra-pipe passage 72a of the secondary air supply pipe 72 is secured, and hindrance to the supply of the secondary air is prevented.

As described above, the internal combustion engine 4 of the embodiment is the in-line multi-cylinder internal combustion engine, and is the horizontally-opposed 6-cylinder internal combustion engine having the two cylinder head portions 40L, 40R. With this taken into consideration, as shown in FIG. 11, which is an explanatory view of the arrangement of the integrated passage-cover units 70 (or 80, and the same will be applied hereinafter) relative to the left and right cylinder head portions 40L, 40R, and which corresponds to the view taken along the XI-XI arrow of FIG. 1, it is desirable that the two cylinder head portions 40L, 40R be respectively provided with the integrated passage-cover units 70 whose specifications are the same, and which each include the reed valve covers 71 and the secondary air supply pipe 72, which are common to the cylinder head portions 40L, 40R.

In this case, when as shown in FIG. 4, the integrated passage-cover unit 70 is attached to the left cylinder head portion 40L, the upstream end 72x of the corresponding secondary air supply pipe 72 is directed toward the front of the vehicle and connected to the downstream end 90y of the secondary air pipe 90, and the upstream side of the secondary air pipe 90 changes its direction rearward and extends rearward in order to be connected to the intake system.

Figure 11:
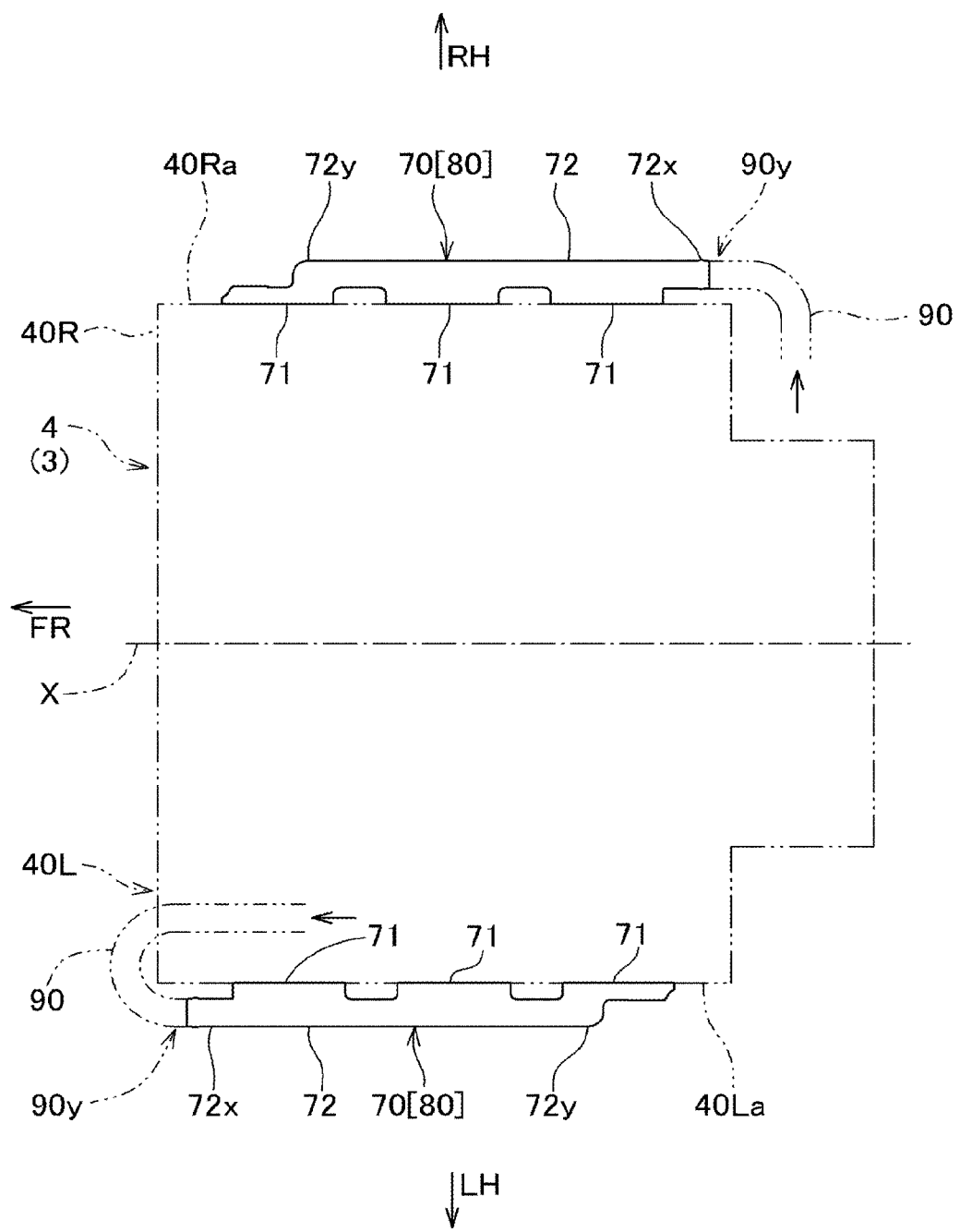

In this case, when as shown in FIG. 11, the integrated passage-cover unit 70 is attached to the right cylinder head portion 40R, the upstream end 72x of the corresponding secondary air supply pipe 72 is directed toward the rear of the vehicle and connected to the downstream end 90y of the other secondary air pipe 90. Since the upstream side of the secondary air pipe 90 is located closer to the intake system, it is easier to connect the upstream side of the secondary air pipe 90 to the intake system.

For these reasons, in the case where the internal combustion engine 4 is the horizontally-opposed 6-cylinder internal combustion engine having the two cylinder head portions 40L, 40R, the use of the integrated passage-cover units 70, including the mutually-common reed valve covers 71 and the mutually-common secondary air supply pipes 72, in the two respective cylinder head portions 40L, 40R makes it possible to reduce the number of types of parts, and accordingly can contribute to cost reduction.

Summaries will be hereinbelow provided for the feature configurations, and operation/working-effect of the exhaust emission control device for the internal combustion engine 4 of the embodiment.

Specifically, the exhaust emission control device for the internal combustion engine 4 includes the multiple reed valve chambers 7, respectively including the reed valves 7a, and provided to each of the cylinder head portions 40L, 40R of the internal combustion engine 4. The reed valve chambers 7 are formed by covering the recessed portions 40a provided to each of the cylinder head portions 40L, 40R with the reed valve covers 71, respectively. The upstream chambers 7A of the reed valve chambers 7 communicate with the atmosphere via the secondary air supply pipes 72, and the downstream chambers 7B of the reed valve chambers 7 communicate with the exhaust ports 37 via the communication passages 91 provided to each of the cylinder head portions 40L, 40R. The reed valves 7a are interposed between the upstream chambers 7A and the downstream chambers 7B of the reed valve chambers 7. The reed valves 7a are opened by the exhaust pulsation pressure.

In each of the cylinder head portions 40L, 40R, the multiple reed valve chambers 7 are disposed with spaces therebetween. The multiple reed valve covers 71 communicate individually with, and are formed integrally with, the secondary air supply pipe 72, and the reed valve covers 71 are connected in series by the secondary air supply pipe 72.

For these reasons, the multiple reed valve chambers 7 are disposed with spaces therebetween, and the size of each reed valve cover 71 is reduced; and the multiple reed valve covers 71 communicating individually with, and formed integrally with, the secondary air supply pipe 72 are connected in series by the secondary air supply pipe 72. Thereby, the multiple reed valve covers 71 can be handled as the single part, and is made capable of receiving the supply of the secondary air. Thus, no connecting member is needed between the secondary air supply pipe 72 and each reed valve cover 71, and no branch leading away from the secondary air supply pipe 72 need be formed. Accordingly, a reduction in the size and weight of the exhaust emission control device is achieved.

In addition, the multiple reed valve covers 71 connected in series by the secondary air supply pipe 72 are connected to, and integrally formed with, the single secondary air supply pipe 72. For this reason, the multiple reed valve covers 71 are produced as a single part. Accordingly, part precision increases, and the number of parts and the number of assembling steps decrease.

Furthermore, each reed valve chamber 7 is disposed to be inclined from the horizontal direction; the communication passage inlet 91a leading to the communication passage 91 is formed above the bottom portion 7b of the inside of the reed valve chamber 7; and the bottom portion 72b of the intra-pipe passage 72a of the secondary air supply pipe 72 is disposed above the communication passage inlet 91a. For these reasons, since the communication passage inlet 91a is disposed above the bottom portion 7b of the inside of the reed valve chamber 7, water in the secondary air can be prevented from flowing into the exhaust port 37 via the communication passage 91; and since the bottom portion 72b of the intra-pipe passage 72a of the secondary air supply pipe 72 is disposed above the communication passage inlet 91a, the cross-sectional area of the intra-pipe passage 72a of the secondary air supply pipe 72 can be secured by preventing water in the secondary air from staying inside the secondary air supply pipe 72, and the hindrance to the supply of the secondary air can be prevented.

Moreover, the reed valve covers 71 are each shaped almost like a rectangle having a longitudinal direction; and the secondary air supply pipes 72 are disposed in the apex portions 40La, 40Ra of the cylinder head portions 40L, 40R in the way to extend in the longitudinal directions of the reed valve covers 71, and in the way to overlap the reed valve covers 71 as viewed in the direction of the cylinder axis Y. For these reasons, the secondary air supply pipes 72 are disposed to overlap the multiple reed valve covers 71. The spaces of the apex portions 40La, 40Ra of the cylinder head portion 40L, 40R are effectively used.

Besides, the internal combustion engine 4 is the in-line multi-cylinder internal combustion engine; the multiple ignition coil devices 34 for the respective cylinders are provided to the outer end of each of the cylinder head portions 40L, 40R in the direction of the cylinder axis Y; and the reed valve chambers 7 and the ignition coil devices 34 are alternately disposed. For these reasons, when the row of the ignition coil devices 34 and the row of the reed valve chambers 7 are shifted from each other in the row width direction, the ignition coil devices 34 and the reed valve covers 71 alternately disposed in each of the apex portions 40La, 40Ra of the respective cylinder head portions 40L, 40R can be placed closer to one another. Thereby, a reduction in the size of the cylinder head portions 40L, 40R can be achieved.

In addition, the internal combustion engine 4 is the horizontally-opposed 6-cylinder internal combustion engine including the two cylinder head portions 40L, 40R, and the two cylinder head portions 40L, 40R each include the reed valve covers 71 and the secondary air supply pipes 72, which are both common to the two cylinder head portions 40L, 40R. For these reasons, the use of the mutually-common reed valve covers 71 and the mutually-common secondary air supply pipes 72 in the two cylinder head portions 40L, 40R makes it possible to reduce the number of types of parts.

Although the embodiment of the present invention has been described, it is a matter of course that: the mode of the present invention is not limited to the foregoing embodiment; and the present invention can be carried out in various modes within the scope of the gist of the present invention.

For example, the multi-cylinder internal combustion engine as the power unit is not limited to the horizontally-opposed 6-cylinder internal combustion engine of the embodiment, and the orientation of the crankshaft is not limited to the vehicle front-rear direction, as long as they fall within the scope of configurations defined by each claim.

Incidentally, although the configurational arrangement of the power unit and the multi-cylinder internal combustion engine, as well as the components of the exhaust emission control device such as the secondary air supply pipes, the reed valve covers and the reed valve chambers is described based on the left-right arrangement illustrated in the embodiment for the sake of explanatory convenience, a left-right reversed arrangement is applicable to the present invention.

LISTING OF REFERENCE NUMERALS

1 MOTORCYCLE
2 VEHICLE BODY FRAME
3 POWER UNIT
4 INTERNAL COMBUSTION ENGINE (WATER-COOLED FOUR STROKE-CYCLE HORIZONTALLY-OPPOSED 6-CYLINDER INTERNAL COMBUSTION ENGINE)
5 TRANSMISSION
7 REED VALVE CHAMBER
7a REED VALVE
7b BOTTOM PORTION
7A UPSTREAM CHAMBER ("UPSTREAM SIDE" IN PRESENT INVENTION)
7B DOWNSTREAM CHAMBER ("DOWNSTREAM SIDE" IN PRESENT INVENTION)
31 CRANKSHAFT
34 IGNITION COIL DEVICE
36 INTAKE PORT
37 EXHAUST PORT
40a RECESSED PORTION
40L (LEFT) CYLINDER HEAD PORTION
40La APEX PORTION
40R (RIGHT) CYLINDER HEAD PORTION
40Ra APEX PORTION
41L (LEFT) HEAD SIDE COVER
42 CRANKCASE
42L LEFT CRANKCASE
42R RIGHT CRANKCASE
43L LEFT CYLINDER HEAD
43R RIGHT CYLINDER HEAD
45L LEFT CYLINDER HEAD COVER
45R RIGHT CYLINDER HEAD COVER
46a CYLINDER BORE
70 INTEGRATED PASSAGE-COVER UNIT
71 REED VALVE COVER
71b INSIDE
72 SECONDARY AIR SUPPLY PIPE
72a INTRA-PIPE PASSAGE
72b BOTTOM PORTION
73 DISTRIBUTION HOLE

74 VALVE PORT
75 VALVE SEAT PLATE
76 VALVE BODY
77 VALVE SPRING
78 PUNCHED PLATE (POROUS PLATE)
79 INTEGRATED PASSAGE-COVER UNIT (OF MODIFICATION)
80 SECONDARY AIR PIPE
90 COMMUNICATION PASSAGE
91a COMMUNICATION PASSAGE INLET
X AXIS OF CRANKSHAFT 31
Y CYLINDER AXIS

What is claimed is:

1. An exhaust emission control device for an internal combustion engine comprising
a plurality of reed valve chambers respectively including reed valves, and provided to a cylinder head portion of a multi-cylinder internal combustion engine,
the reed valve chambers being formed by covering recessed portions provided to the cylinder head portion respectively with reed valve covers, and
the reed valve chambers having upstream sides which communicate with the atmosphere via a separate secondary air supply pipe provided to the cylinder head portion; and downstream sides which communicate with exhaust ports via communication passages provided to the cylinder head portion, and
the reed valves being interposed between the upstream sides and the downstream sides of the reed valve chambers, and the reed valves being opened by exhaust pulsation pressure, wherein
in the cylinder head portion, the plurality of reed valve chambers are disposed with spaces therebetween,
the plurality of reed valve covers communicate individually with the secondary air supply pipe, and the reed valve covers are connected in series by the secondary air supply pipe, and
the plurality reed valve covers are integrally formed with the secondary air supply pipe into an integrated passage-cover unit that is releasably connected to the cylinder head portion and covered by a cylinder head cover.

2. The exhaust emission control device for an internal combustion engine according to claim 1, wherein
all of the plurality of reed valve covers connected in series by the secondary air supply pipe are connected to, and integrally formed with, a single one of the secondary air supply pipe.

3. The exhaust emission control device for an internal combustion engine according to claim 1, wherein
each of the reed valve chambers is disposed to be inclined from a horizontal direction,
a communication passage inlet leading to a corresponding one of the communication passages is formed above a bottom portion of an inside of the reed valve chamber, and
a bottom portion of an intra-pipe passage of the secondary air supply pipe is disposed above the communication passage inlet.

4. The exhaust emission control device for an internal combustion engine according to claim 1, wherein
the reed valve covers are each shaped almost like a rectangle having a longitudinal direction, and
the secondary air supply pipe is disposed in an apex portion of the cylinder head portion in a way to extend in the longitudinal direction of each reed valve cover, and in a way to overlap the reed valve covers as viewed in a direction of a cylinder axis.

5. The exhaust emission control device for an internal combustion engine according to claim 4, wherein
the multi-cylinder internal combustion engine is an in-line multi-cylinder internal combustion engine,
a plurality of ignition coil devices respectively for cylinders are provided to an outer end of the cylinder head portion in the direction of the cylinder axis, and
the reed valve chambers and the ignition coil devices are alternately disposed.

6. The exhaust emission control device for an internal combustion engine according to claim 5, wherein
the in-line multi-cylinder internal combustion engine including two of the cylinder head portions horizontally-opposed from one another, and
the two cylinder head portions include the reed valve covers and the secondary air supply pipe common to each other.

7. The exhaust emission control device for an internal combustion engine according to claim 2, wherein
each of the reed valve chambers is disposed to be inclined from a horizontal direction,
a communication passage inlet leading to a corresponding one of the communication passages is formed above a bottom portion of an inside of the reed valve chamber, and
a bottom portion of an intra-pipe passage of the secondary air supply pipe is disposed above the communication passage inlet.

8. The exhaust emission control device for an internal combustion engine according to claim 2, wherein
the reed valve covers are each shaped almost like a rectangle having a longitudinal direction, and
the secondary air supply pipe is disposed in an apex portion of the cylinder head portion in a way to extend in the longitudinal direction of each reed valve cover, and in a way to overlap the reed valve covers as viewed in a direction of a cylinder axis.

9. The exhaust emission control device for an internal combustion engine according to claim 3, wherein
the reed valve covers are each shaped almost like a rectangle having a longitudinal direction, and
the secondary air supply pipe is disposed in an apex portion of the cylinder head portion in a way to extend in the longitudinal direction of each reed valve cover, and in a way to overlap the reed valve covers as viewed in a direction of a cylinder axis.

10. The exhaust emission control device for an internal combustion engine according to claim 8, wherein
the multi-cylinder internal combustion engine is an in-line multi-cylinder internal combustion engine,
a plurality of ignition coil devices respectively for cylinders are provided to an outer end of the cylinder head portion in the direction of the cylinder axis, and
the reed valve chambers and the ignition coil devices are alternately disposed.

11. The exhaust emission control device for an internal combustion engine according to claim 10, wherein
the in-line multi-cylinder internal combustion engine including two of the cylinder head portions horizontally-opposed from one another, and
the two cylinder head portions include the reed valve covers and the secondary air supply pipe common to each other.

12. The exhaust emission control device for an internal combustion engine according to claim 9, wherein the multi-cylinder internal combustion engine is an in-line multi-cylinder internal combustion engine, a plurality of ignition coil devices respectively for cylinders are provided to an outer end of the cylinder head portion in the direction of the cylinder axis, and the reed valve chambers and the ignition coil devices are alternately disposed.

13. The exhaust emission control device for an internal combustion engine according to claim 12, wherein the in-line multi-cylinder internal combustion engine including two of the cylinder head portions horizontally-opposed from one another, and the two cylinder head portions include the reed valve covers and the secondary air supply pipe common to each other.

* * * * *